US 12,095,200 B2

(12) United States Patent
Demaratos

(10) Patent No.: US 12,095,200 B2
(45) Date of Patent: Sep. 17, 2024

(54) ELASTOMER SEAL SPRING

(71) Applicant: J.S.T. CORPORATION, Farmington Hills, MI (US)

(72) Inventor: David Demaratos, Wixom, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 0 days.

(21) Appl. No.: 18/404,237

(22) Filed: Jan. 4, 2024

(65) Prior Publication Data

US 2024/0162648 A1 May 16, 2024

Related U.S. Application Data

(62) Division of application No. 17/703,764, filed on Mar. 24, 2022, now Pat. No. 11,946,546.

(Continued)

(51) Int. Cl.
*H01R 13/52* (2006.01)
*F16J 15/02* (2006.01)
(Continued)

(52) U.S. Cl.
CPC ........ *H01R 13/5219* (2013.01); *F16J 15/024* (2013.01); *F16J 15/025* (2013.01);
(Continued)

(58) Field of Classification Search
CPC ........ F16J 15/024; F16J 15/025; F16J 15/028; H01R 13/436; H01R 13/4362;
(Continued)

(56) References Cited

U.S. PATENT DOCUMENTS 3,678,441 A * 7/1972 Upstone ............... H01R 13/523
439/272
3,768,819 A 10/1973 Burkett
(Continued)

OTHER PUBLICATIONS

International Search Report for International Application No. PCT/US2022/022391 dated Aug. 19, 2022 (4 sheets).
(Continued)

*Primary Examiner* — Nicholas L Foster
(74) *Attorney, Agent, or Firm* — Kratz, Quintos & Hanson, LLP

(57) ABSTRACT

The seal spring of the present invention has a dual functionality. The seal spring provides both a sealing property and spring function in use within an electrical connector system, which is accomplished by its elastomeric qualities. The seal spring is preferably comprised of Silicone, EPDM rubber or materials and compositions that provide similar performance during use, or the like. The seal spring of the present invention is not limited or defined into a spring section or a seal section by its geometry. Shown is an implementation of the seal spring within an outer housing and connector assembly. The seal spring compresses and provides adequate spring force against a tab or tabs within the outer housing. The seal spring also functions as an interface seal and an environmental seal during use. The seal spring is, substantially, in its entirety, of a contiguous and continuous single construction. No part or section of the seal spring is made up of welded, soldered, or brazen part or section.

10 Claims, 6 Drawing Sheets

Related U.S. Application Data

(60) Provisional application No. 63/169,511, filed on Apr. 1, 2021.

(51) Int. Cl.
 *H01R 43/00* (2006.01)
 *H01R 13/506* (2006.01)

(52) U.S. Cl.
 CPC ........... *F16J 15/028* (2013.01); *H01R 13/506* (2013.01); *H01R 13/5202* (2013.01); *H01R 13/5208* (2013.01); *H01R 13/5216* (2013.01); *H01R 43/005* (2013.01)

(58) Field of Classification Search
 CPC .. H01R 13/52; H01R 13/5202; H01R 13/521; H01R 13/5216; H01R 13/5219; H01R 13/631; H01R 13/639; H01R 43/005
 See application file for complete search history.

(56) References Cited

U.S. PATENT DOCUMENTS

| | | |
|---|---|---|
| 4,195,893 A | 4/1980 | Stupay |
| 5,782,657 A | 7/1998 | Wolla |
| 6,015,304 A | 1/2000 | Yagi |
| 6,234,847 B1 | 5/2001 | Chang |
| 6,364,692 B1 | 4/2002 | Okayasu |
| 7,140,897 B2 | 11/2006 | Axenbock |
| 7,976,340 B1 | 7/2011 | Saraswat |
| 8,758,035 B2 | 6/2014 | Morello |
| 9,234,433 B2 * | 1/2016 | Helvaci ................. F01D 11/00 |
| 9,234,612 B2 | 1/2016 | Santi |
| 9,368,906 B2 | 6/2016 | Endo |
| 9,500,307 B2 | 11/2016 | Beagen |
| 9,534,715 B2 | 1/2017 | Beagen |
| 10,033,131 B2 * | 7/2018 | Uchiyama .......... H01R 13/5202 |
| 10,116,078 B1 | 10/2018 | Durse et al. |
| 10,385,997 B2 | 8/2019 | Beagen |
| 10,641,421 B2 | 5/2020 | Beagen |
| 10,686,274 B2 | 6/2020 | Forell |
| 10,731,760 B2 | 8/2020 | Ishigami |
| 11,365,835 B2 | 6/2022 | Beagen |
| 11,456,560 B2 | 9/2022 | Masuda |
| 2001/0053624 A1 | 12/2001 | Medina |
| 2002/0142636 A1 | 10/2002 | Murr |
| 2003/0134531 A1 | 7/2003 | Luft |
| 2004/0147146 A1 | 7/2004 | Vermeersch |
| 2005/0037651 A1 | 2/2005 | Axenbock |
| 2006/0134982 A1 | 6/2006 | Zarganis |
| 2007/0059970 A1 | 3/2007 | Ichio |
| 2008/0057758 A1 | 3/2008 | Walter |
| 2008/0299826 A1 | 12/2008 | Cheng |
| 2008/0318473 A1 | 12/2008 | Morikawa |
| 2010/0003852 A1 | 1/2010 | Myer |
| 2010/0160991 A1 | 6/2010 | Lim |
| 2010/0181727 A1 | 7/2010 | Santi |
| 2011/0280653 A1 | 11/2011 | Sjostedt |
| 2013/0072063 A1 | 3/2013 | Qiao |
| 2013/0187345 A1 | 7/2013 | Beagen |
| 2013/0187346 A1 | 7/2013 | Beagen |
| 2013/0330950 A1 | 12/2013 | Morello |
| 2014/0106597 A1 | 4/2014 | Gimbel et al. |
| 2017/0016560 A1 | 1/2017 | Beagen |
| 2017/0018874 A1 | 1/2017 | Kida |
| 2017/0074433 A1 | 3/2017 | Beagen |
| 2018/0076561 A1 * | 3/2018 | Aoshima ................ H01R 13/40 |
| 2018/0163868 A1 | 6/2018 | Ishigami |
| 2019/0214764 A1 | 7/2019 | Forell |
| 2020/0191303 A1 | 6/2020 | Beagen |
| 2022/0282809 A1 | 9/2022 | Beagen |
| 2022/0320790 A1 | 10/2022 | Demaratos |
| 2022/0320803 A1 | 10/2022 | Demaratos |
| 2022/0320804 A1 | 10/2022 | Demaratos |

OTHER PUBLICATIONS

International Search Report for International Application No. PCT/US2022/022605 dated Aug. 19, 2022 (4 sheets).

International Search Report for International Application No. PCT/US2022/022912 dated Jul. 8, 2022 (2 sheets).

\* cited by examiner

ELASTOMER SEAL SPRING

CROSS-REFERENCE TO RELATED PATENT APPLICATION

This patent application claims priority to Provisional Patent Application Ser. No. 63/169,511 filed on Apr. 1, 2021, which is hereby incorporated herein by reference in its entirety.

BACKGROUND OF THE INVENTION

Field of the Invention

Silicone or any elastomer material (material that is rubber like in nature) is often used in applications, specifically in electrical connector systems, as a material which will form a seal for the purpose of preventing outside elements, such as but not limited to, water, air (any gaseous element or molecule), or any debris defined as any foreign material not present when the connector system is assembled, from entering into the connector system. These seals are classified as environmental seals. The sealing property of a specific environmental seal is accomplished by the elastomeric property of the material and the proper geometric shape or shapes for operating within its location in the connector system. These environmental seals are also often named based on their intended location of use, with terms such as face seal, interface seal, ring seal, cable seal, mat (or matte) seal, and wire seal.

With dual functionality environmental seals, the seal can provide both a sealing property and spring function within an electrical connector assembly. The seal has a spring function which is accomplished by its elastomeric qualities yet can still operate as an environmental seal in use. The seal is comprised of Silicone, EPDM rubber, materials and compositions which provide similar performance during use, or the like. Additionally, the seal is not limited or defined into a spring section or a seal section by its geometry. Thus, the seal spring is not geometry based and it may function anywhere the dual functionality of a seal function and spring function is required. One such implementation is within an inner cavity of a housing of a connector assembly as an interface seal, which is described in detail in the present application.

SUMMARY OF THE INVENTION

The seal spring of the present invention has a dual functionality. In use, the seal spring provides both a sealing property and spring function within an electrical connector assembly. The sealing property of the seal spring can also provide an environmental seal when located within a connector assembly, housing, or other similar use within a connector system. This dual functionality in use, when the seal spring simultaneously acts as both a seal and a spring, is accomplished by its elastomeric qualities. The seal spring is comprised of Silicone, EPDM rubber, materials and compositions which provide similar performance during use, or the like. Additionally, the seal spring of the present invention is also not limited or defined into a spring section or a seal section by its geometry. Thus, the seal spring is not geometry based and it may function anywhere the dual functionality of a seal function and spring function is required. One such implementation is within an inner cavity of a housing of a connector assembly, which is described in detail in the present application.

The seal spring of the present invention, will interact with an outer housing and connector system but is not limited thereto. The seal spring will be compressed and deformed, pressing against a tab or tabs of an outer housing of the connector assembly and acting as a spring against the tab or tabs. The seal spring will therefore provide a spring function in use. The seal spring is compressed and deformed into an inner cavity of the outer housing when a third outer housing presses the seal fully into the outer housing and the tab or tabs compresses and deforms an inner surface of the seal spring, and another third outer housing is inserted into the inner aperture of the seal spring. The elastomeric properties and durometer specification of the seal spring allows the compressed state of the seal spring to exert a spring force against the tab or tabs of the outer housing. The seal spring thus generates and exerts an outward spring force, which in use, acts to push the seal spring against the tab or tabs which will then press against the third outer housing or similar feature within a connector. The seal spring, providing additional force against the tabs, providing for higher contact pressure against the third outer housing when used within a completed connector assembly.

Additionally, the sealing properties of the seal spring allow the compressed seal spring to also provide a sealing function. The seal spring has two seal portions, one on its side and one on its inner side wall. The seal spring provides an outer sealing function against the outer housing and an inner sealing function against an inner housing. The seal spring will thus act as an interface seal, pressing against a surface of the cavity of the outer housing and against a surface of the inner housing of the connector system, also providing an environmental seal when used in this manner. Thus, the seal spring will have a dual purpose, simultaneously acting as both an environmental seal and a spring when in use within the connector assembly.

Moreover, the seal spring of the present invention is, substantially, in its entirety, of a contiguous and continuous single construction. No part or section of the seal spring of the present invention is made up of welded, soldered, or brazen part or section.

DETAILED DESCRIPTION OF THE PREFERRED EMBODIMENTS

Figure 1:
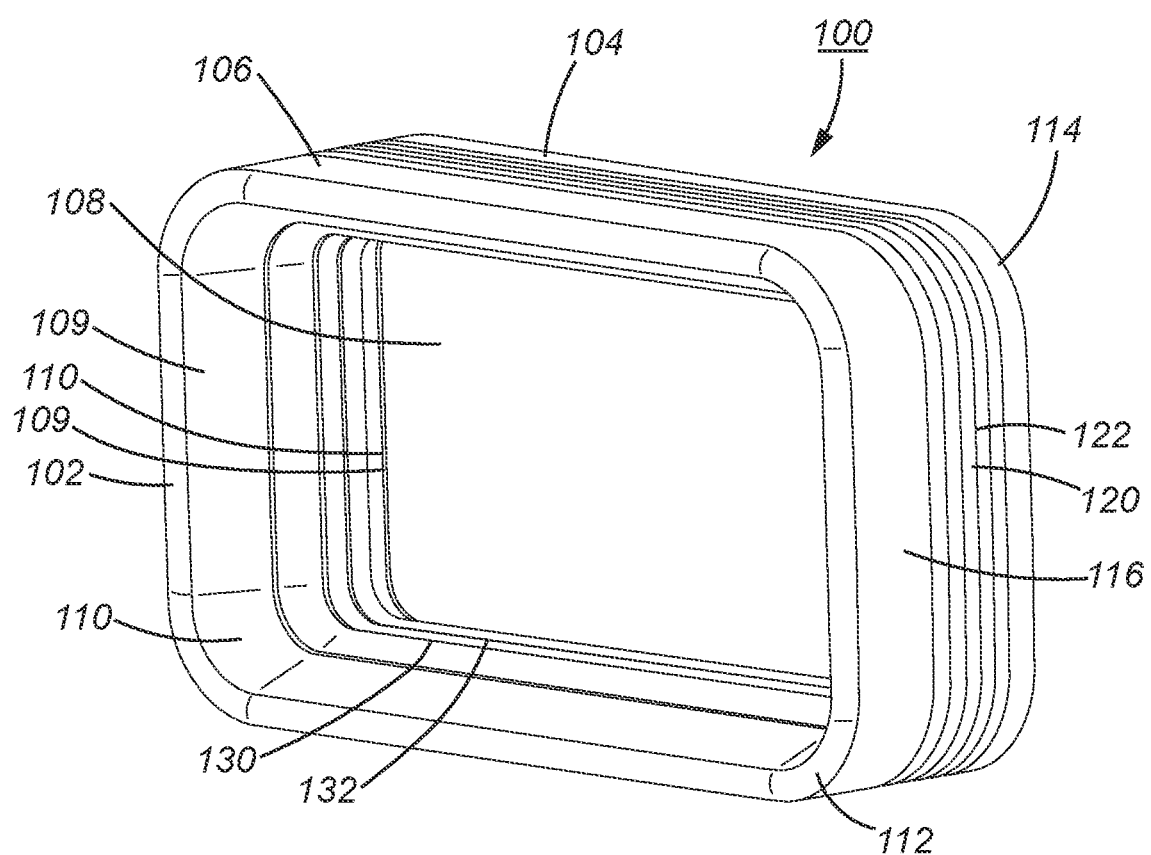
FIG. 1 is a front perspective view of the seal spring of the present invention.

As seen in FIG. 1 is the preferred embodiment of the seal spring 100 of the present invention. The seal spring 100 is preferably comprised of silicone, EPDM rubber or materials and compositions that provide similar performance during use, or the like. The seal spring 100 has a first face 102, a first face surface 112, a second face 104, a second face surface 114 and a side 106. The second face 104 and the second face surface 114, extending substantially perpendicular to the side 106. The side 106 having a surface 116 and the side 106 being between the first face 102 and second face 104. The seal spring 100 also has an outer sealing portion 120 which is on a portion of the side 106, extending outward from the side 106, and is formed by a portion of the side surface 116. Here, the outer sealing portion 120 is preferably substantially located toward the second face 104, and is disproportionately located on the seal spring 100, and disproportionate on the side 106 thereof, wherein it is not centrally located nor equidistant with respect to the distance between the first face 102 and the second face 104, respectively. Further, the seal spring 100 has an inner aperture 108, having an inner side wall 109. The inner side wall 109 having a surface 110. Additionally, the seal spring 100 has an inner sealing portion 130 located on the inner side wall 109 and extending inward inside the inner aperture 108 on a portion of respective inner side wall 109, and formed by a portion of the surface 110. Here, the inner sealing portion 130 is preferably substantially located toward the second face 104, and is disproportionately located on the seal spring 100, and disproportionate on the inner side wall 109 thereof, wherein it is not centrally located nor equidistant with respect to the distance between the first face 102 and the second face 104, respectively.

Moreover, the seal spring 100 of the present invention is, substantially, in its entirety, of a contiguous and continuous single construction. No part or section of the seal spring 100 of the present invention is made up of welded, soldered, or brazen part or section. The seal spring 100 composition is homogeneous, or bi-material (co-molded), having properties of an elastomer, or rubber.

Figure 2:
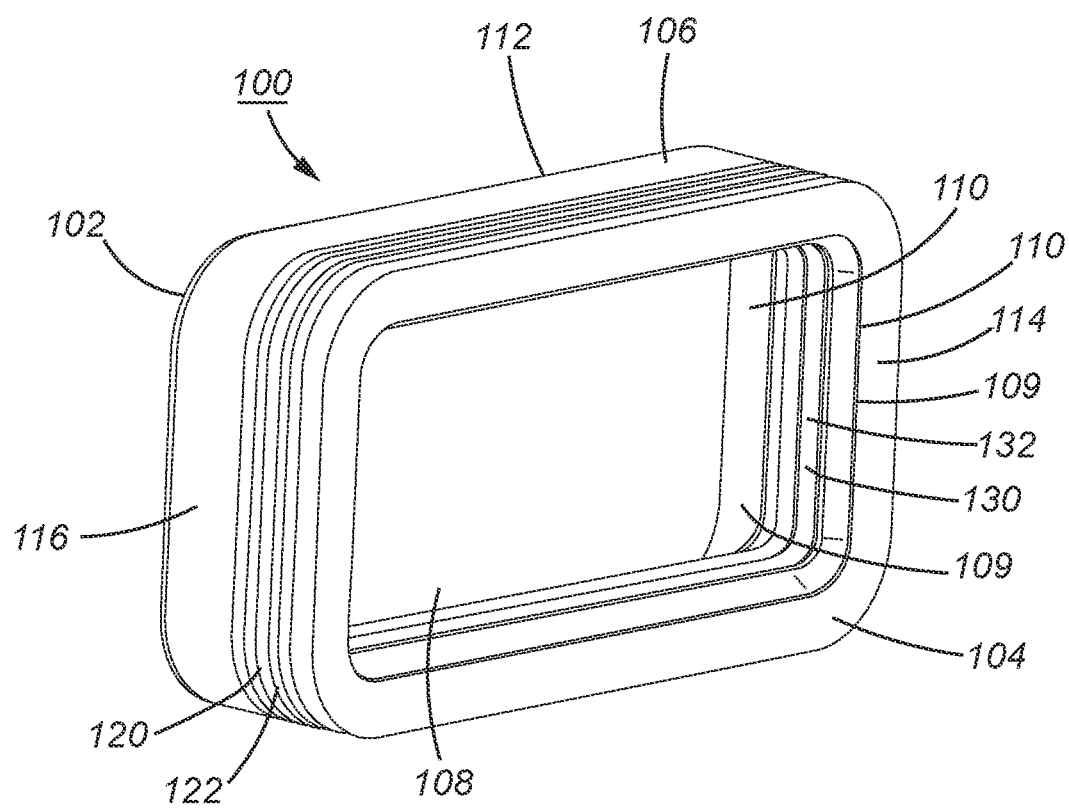
FIG. 2 is a rear perspective view of the seal spring of the present invention.

FIG. 2 illustrates the second face 104 and second face surface 114 of seal spring 100. The side 106 having a side surface 116 is also illustrated. As previously mentioned, the seal spring 100 has an outer sealing portion 120 and an inner sealing portion 130. The outer sealing portion 120 interacts and seals with an outer housing 200 of a connector assembly (see, FIG. 6). The inner sealing portion 130 interacts and seals with a third outer housing 400 as will be discussed in more detail later (see, FIG. 6).

Also shown in FIG. 1, the seal spring 100 has a flared, or angled portion of the inner side wall 109. This flared, or angled portion of the inner side wall 109 will act as a spring when the seal spring 100 is in use, as will be discussed later (See, FIG. 6). The flared, or angled portion of the inner side wall 109 is being flared, or angled, wherein the portion of the inner side wall 109 is narrowly tapered along its length with respect to a lengthwise direction (being defined as the direction from the first face 102 to the second face 104, and vice versa) of the seal spring 100, and narrowly tapering in the direction from the inner sealing portion 130 towards the first face 102. Additionally, the flared, or angled portion of the inner side wall 109 provides a portion of the surface 110 which is narrowly tapered along its length with respect to the aforementioned lengthwise direction of the seal spring 100, narrowly tapering in the direction from the inner sealing portion 130 towards the first face 102. The flared or angled portion of the inner side wall 109 is also thereby respectively enlarging the area or size of the inner aperture 108 along the distance from the inner sealing portion 130 towards the first face 102; and conversely is restricting the size of the inner aperture 108 along the distance from the first face 102 towards the inner sealing portion 130 in the lengthwise direction (being defined as the direction from the second face 104 to the first face 102, and vice versa). As previously mentioned, the purpose of the flared, or angled portion of the inner side wall 109 of the seal spring 100 will be providing a spring function, and will be discussed later.

Figure 3:
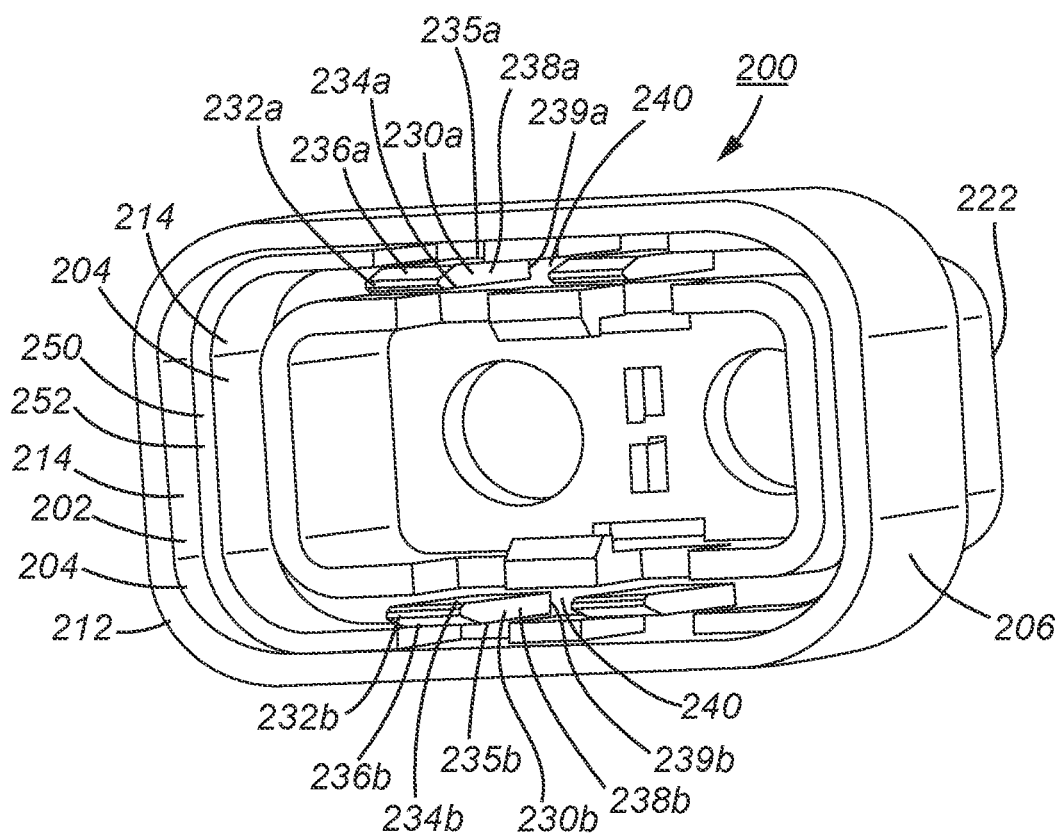
FIG. 3 is an end perspective view of the outer housing of the present invention.

Shown in FIG. 3 is the outer housing 200 of the connector assembly. The outer housing 200 has a body 206 having an inner cavity 204. The inner cavity 204 has a side wall 214. Additionally, the inner cavity 204 of the outer housing 200 has an opening 202 within a first end portion 212 of the outer housing 200. Further, the outer housing 200 has a second end portion 222. The inner cavity 204 of the outer housing 200 also has a seal forward stop 250 having a surface 252. The seal forward stop 250 and the surface 252, extend substantially perpendicular along its length to the side wall 214 with respect to a lengthwise direction of the outer housing 200 (being defined as the direction from the first end portion 212 to the second end portion 222, and vice versa). The seal forward stop 250 and its surface 252 are provided to interact with the seal spring 100 when the seal spring 100 is inserted into the inner cavity 204 and the seal spring 100 is in use with the outer housing 200.

Also shown in FIG. 3 is the first tab 230*a* of the outer housing 200 and the second tab 230*b* of the outer housing 200. The outer housing 200 may have a pair of first tabs 230*a*, as shown, but the quantity is not limited thereto. The outer housing 200 may have a pair of second tabs 230*b*, as shown, but the quantity is not limited thereto. The first tab 230*a* of the outer housing 200 and the second tab 230*b* of the outer housing 200, extend within the inner cavity 204, extending substantially perpendicularly from a rear wall 240 of the outer housing 200. The rear wall 240 is within the inner cavity 204 and extends substantially perpendicular along its length from the side wall 214 of the inner cavity 204 of the outer housing 200, with respect to a lengthwise direction of the outer housing 200 (being defined as the direction from the first end portion 212 to the second end portion 222, and vice versa). The first tab 230*a* and second tab 230*b* each have a tip 232*a*, 232*b*, respectively, located at an end of each tab 230*a*, 230*b*. The tab 230*a*, 230*b* extends within the inner cavity 204 towards the opening 202, the direction of which having the tip 232*a*, 232*b* facing substantially towards the opening 202 of the outer housing 200. The other, opposite end of the tab 230*a*, 230*b*, is the attached end 239*a*, 239*b*. The attached end 239*a*, 239*b* which is the portion of the tab 230*a*, 230*b* attached to the rear wall 240 of the outer housing 200. Each tab 230*a*, 230*b* having a cantilever beam arm 238*a*, 238*b*, respectively. The cantilever beam arm 238*a*, 238*b*, is formed by and along the length of the tab 230*a*, 230*b*, more specifically, by the portion of the tab 230*a*, 230*b* between the attached end 239*a*, 239*b* and the tip 232*a*, 232*b*.

The first tab 230*a* and second tab 230*b* each also have an angled lead in 236*a*, 236*b*, respectively. Each of the angled lead in 236*a*, 236*b* is angled, or tapered generally along its length towards the tip 232*a*, 232*b*, and tapering in a direction with respect to the lengthwise direction of the outer housing 200 (being defined as the direction from the first end portion 212 to the second end portion 222, and vice versa). Each of the angled lead in 236*a*, 236*b* substantially faces the side wall 214 of the inner cavity 204 of the outer housing 200. The angled lead in 236*a*, 236*b* of each of the first tab 230*a* and second tab 230*b* will make contact with the seal spring 100 when in use, and as discussed later.

The first tab 230*a* and second tab 230*b* each also have a first surface 234*a*, 234*b* and a second surface 235*a*, 235*b*, respectively. Each first surface 234a, 234b face the inner cavity 204 of the outer housing. Each first surface may face another one of a first surface 234a, 234b. As seen in FIG. 1, along its length, the first surface 234a of the first tab 230a substantially faces the opposing, opposite, first surface 234b of the second tab 230b, and vice versa. The second surface 235a, 235b faces the side wall 214 of the inner cavity 204 of the outer housing 200.

Figure 4:
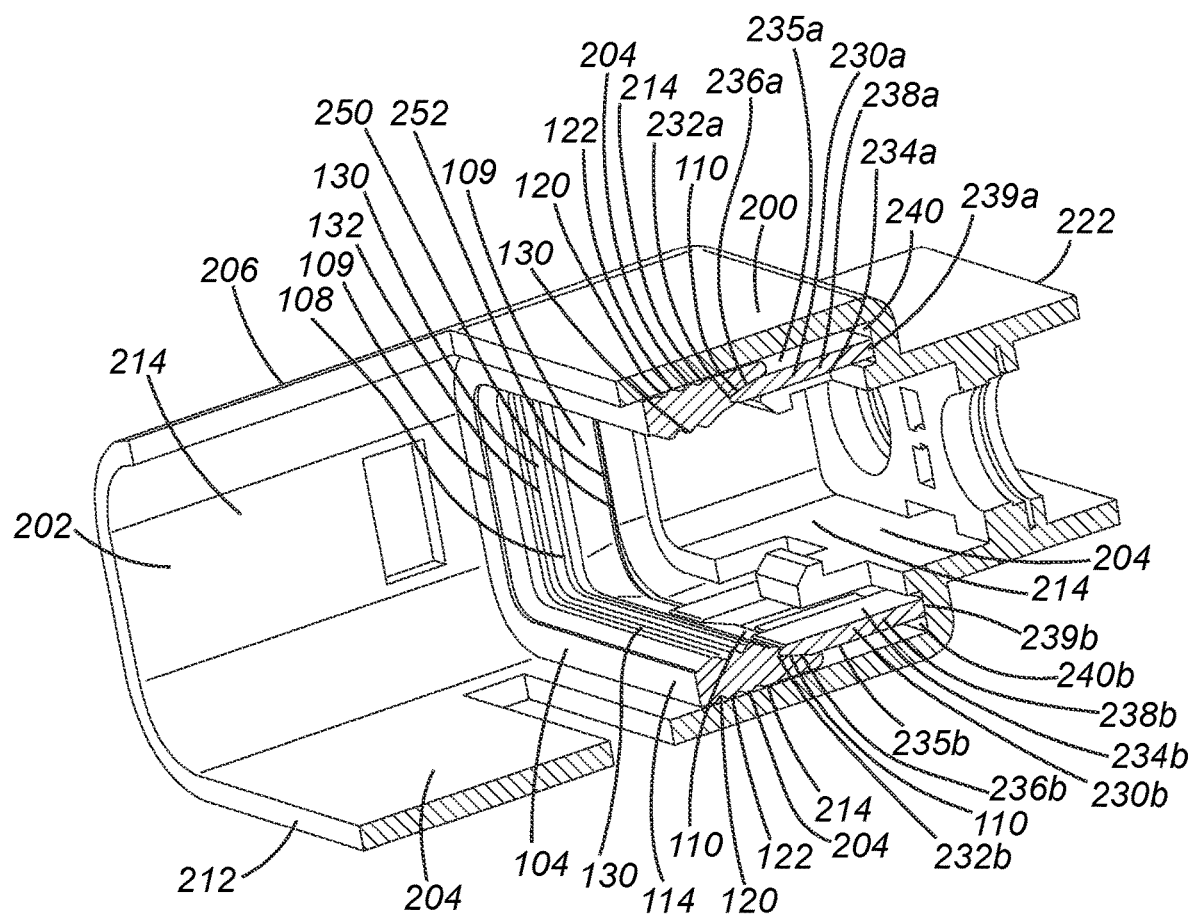
FIG. 4 is a cross section view of the outer housing and the seal spring, the seal spring residing in the outer housing.

Illustrated in FIG. 4 is the outer housing 200 with the seal spring 100 inserted. Here the seal spring 100 is inserted into the outer housing 200, and the first face 102 is inserted first towards the rear 222 of the outer housing 200. The first face 102 and first face surface 112 of the seal spring 100 may also abut the forward stop 250 and surface 252 thereof. The first tab 230a and second tab 230b of the outer housing 200 have entered the inner aperture 108 of the seal spring 100, the respective tips 232a, 232b have initially entered the inner aperture 108 of the seal spring 100 and have made contact with the seal spring 100. Further, the angled lead in 236a, 236b of each of the respective tab or tabs 230a, 230b will make further contact with the inner side wall 109 of the seal spring 100 as the seal spring 100 is inserted further into the outer housing 200, as shown.

As seen in FIG. 4, the seal spring 100 may be inserted into the outer housing 200 and the seal spring 100 will be held in the outer housing 200 by a second outer housing 300. The cavity of the outer housing 200, and the aperture 108 of seal spring 100, have a space wherein a third outer housing 400 may be inserted and accommodated, as will be seen in FIG. 6.

As discussed above, the tabs 230a, 230b abut and contact against the surface 110 of the inner side wall 109 of the seal spring 100. More specifically, the tabs 230a, 230b abut and contact the flared, or angled portion of the inner side wall 109. The flared, or angled portion of the inner side wall 109 of the seal spring 100 compresses as the tab 230a, 230b enters the inner aperture 108 and contacts the seal spring 100, wherein the seal spring 100 asserts a spring-like force against the tab 230a, 230b. The tabs 230a, 230b, as shown in FIG. 4, have pressed into, and pushed into, the inner surface 109 of the seal spring 100. The seal spring 100 can be further inserted into the outer housing 200 and tabs 230a, 230b and will further press into, and push into the inner surface 109 of the seal spring 100 when the second outer housing 300 is inserted and subsequent third outer housing 400 is then inserted (See, FIG. 5, 6). The seal spring 100 will provide and exert an adequate spring force against the tab 230a, 230b and apply its spring force, pushing itself in an outward direction towards and against the tip 232a, 232b, the angled lead in 236a, 236b, and the second surface 235a, 235b of the tab 230a, 230b when in use. Further, the angle or taper of the inner side wall 109 is such that the angled lead in portion 236a, 236b of the tab 230a, 230b will reside on the flared, or angled portion of the inner side wall 109 when the tab 230a, 230b makes substantial contact with the surface 110 of the inner side wall 109 of seal spring 100. The first face 102 of the seal spring 100 may not make substantial contact with the tip 232a, 232b of each tab 230a, 230b, as the seal spring 100 is inserted into the outer housing 200. Therein, the first face 102 will reside below the tip 232a, 232b, angled lead in 236a, 236b, and the second surface 235a, 235b when the seal spring 100 is inserted. Moreover, the angle or taper of the inner side wall 109, is such that the flared, or angled portion of the inner side wall 109 will reside below the angled lead in portion 236a, 236b of the respective tab 230a, 230b. Thus, the spring force of the seal spring 100 is asserted and applied to the tab 230a, 230b by the angle or tapered portion of the inner side wall 109. More specifically, the spring force is generally directed toward and against the angled lead in portion 236a, 236b of the tab 230a, 230b. The tab 230a, 230b is slightly flexible, and is flexible along its length at the cantilever beam arm 238a, 238b portion. The tab 230a, 230b will flex when the tip 232a, 232b, angled lead in 236a, 236b, or second surface 235a, 235b is contacted, as here, by the seal spring (see, FIG. 5, 6). The angle or taper of the inner side wall 109 of the seal 100 also prevents the seal spring 100 from being marred, warped, ripped, or torn or otherwise destructed in its use, when it comes in contact with the tab 230a, 230b or similar feature of a connector housing, when inserted and in use.

Figure 5:
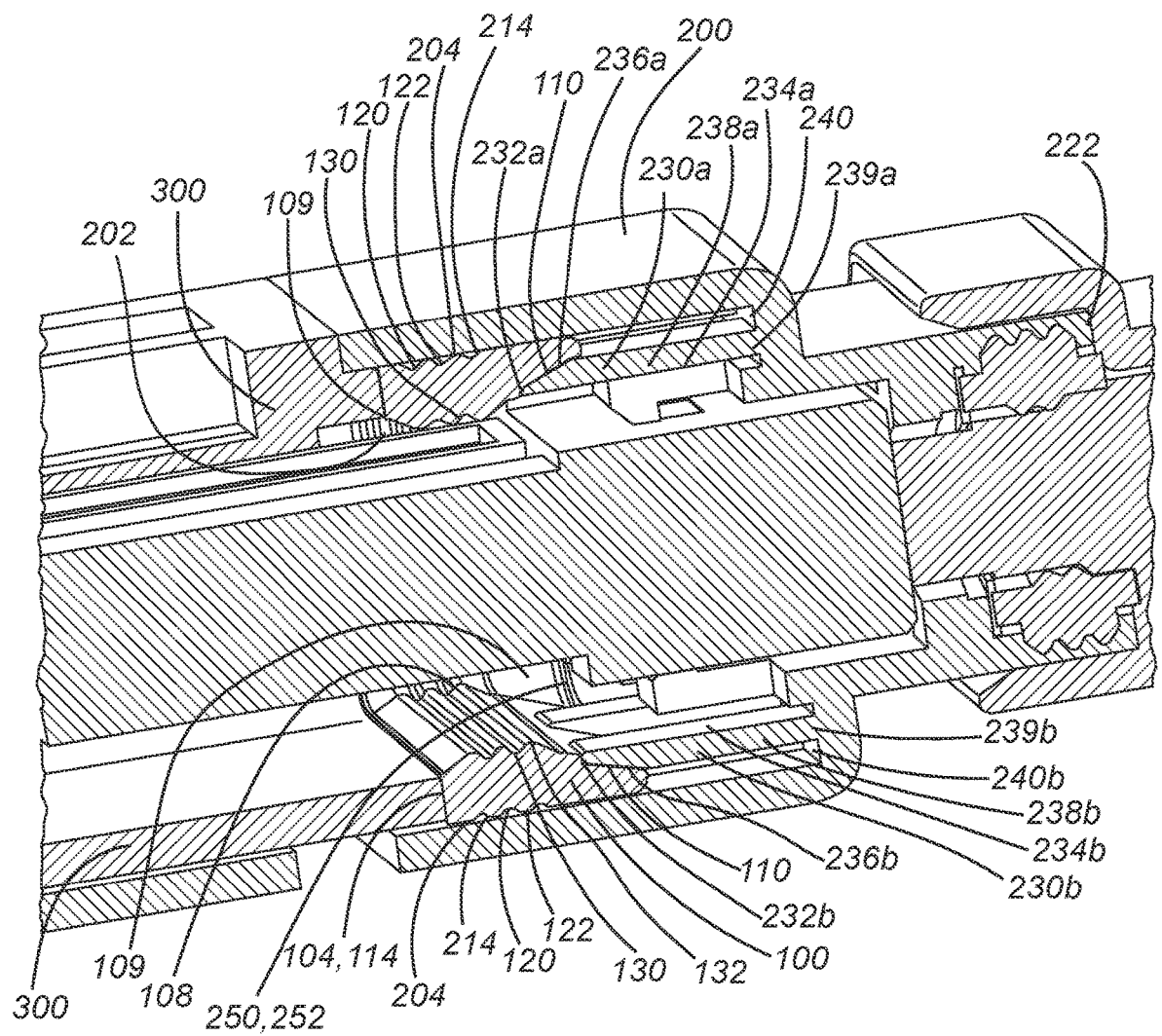
FIG. 5 is a cross section view of the outer housing, the outer housing having the seal spring inserted and residing in the cavity of the outer housing, the second outer housing installed.

FIG. 5 shows a connector system having the outer housing 200 and a second outer housing 300, with the seal spring 100 inserted into the outer housing 200. Here, as in FIG. 4, the seal spring 100 has been inserted into the 204 inner cavity of the outer housing 200, with the first face 102 of the seal spring 100 inserted first into the inner cavity 204 and pushed forward towards the rear end 222 of the outer housing 200. The second face 104 is exposed within the inner cavity 204, facing towards the opening 202 of the outer housing 200. As shown, the second outer housing 300 has been inserted through the opening 202 and into the inner cavity 204 of the outer housing 200. The second outer housing 300 presses, contacts, and abuts the seal spring 100, making contact at the second face 104 and second face surface 114 of the seal spring 100. As previously mentioned, the second face 104 and the second face surface 114, extend substantially perpendicular to the side 106 of the seal spring 100. The second outer housing 300 pushes the seal spring 100 further forward into the inner cavity 204, and towards the second end portion 222 and the tabs 230a, 230b. At this point, the first face 102 and first face surface 112 of the seal spring 100 will abut the forward stop 250, the forward stop 250 limits the movement of the seal spring 100 further into the inner cavity 204 of the outer housing 200. The seal spring 100 is now in a secured and stationary position within the connector system and in the outer housing 200 and inner cavity 204. In this secured, and stationary position within the inner cavity 204, in respect to the lengthwise direction of the outer housing 200 (being defined as the direction from the first end portion 212 to the second end portion 222, and vice versa), the seal spring 100 resides in the inner cavity 204 between the end of the second outer housing 300 and the forward stop 250 of the outer housing 200. Also, when the seal spring 100 is in this secured, stationary position, the seal spring 100 is exerting a greater spring force against the tabs 230a, 230b than its previous position or positions inside the inner cavity 204 of the outer housing 200. Concurrently, the tabs 230a, 230b have inserted further into the inner aperture 108 of the seal spring 100, and have further moved into and compressed into the flared, or angled portion of the inner surface 109 of the seal spring 100, when in comparison to its previous position or positions inside the inner cavity 204 of the outer housing 200.

Figure 6:
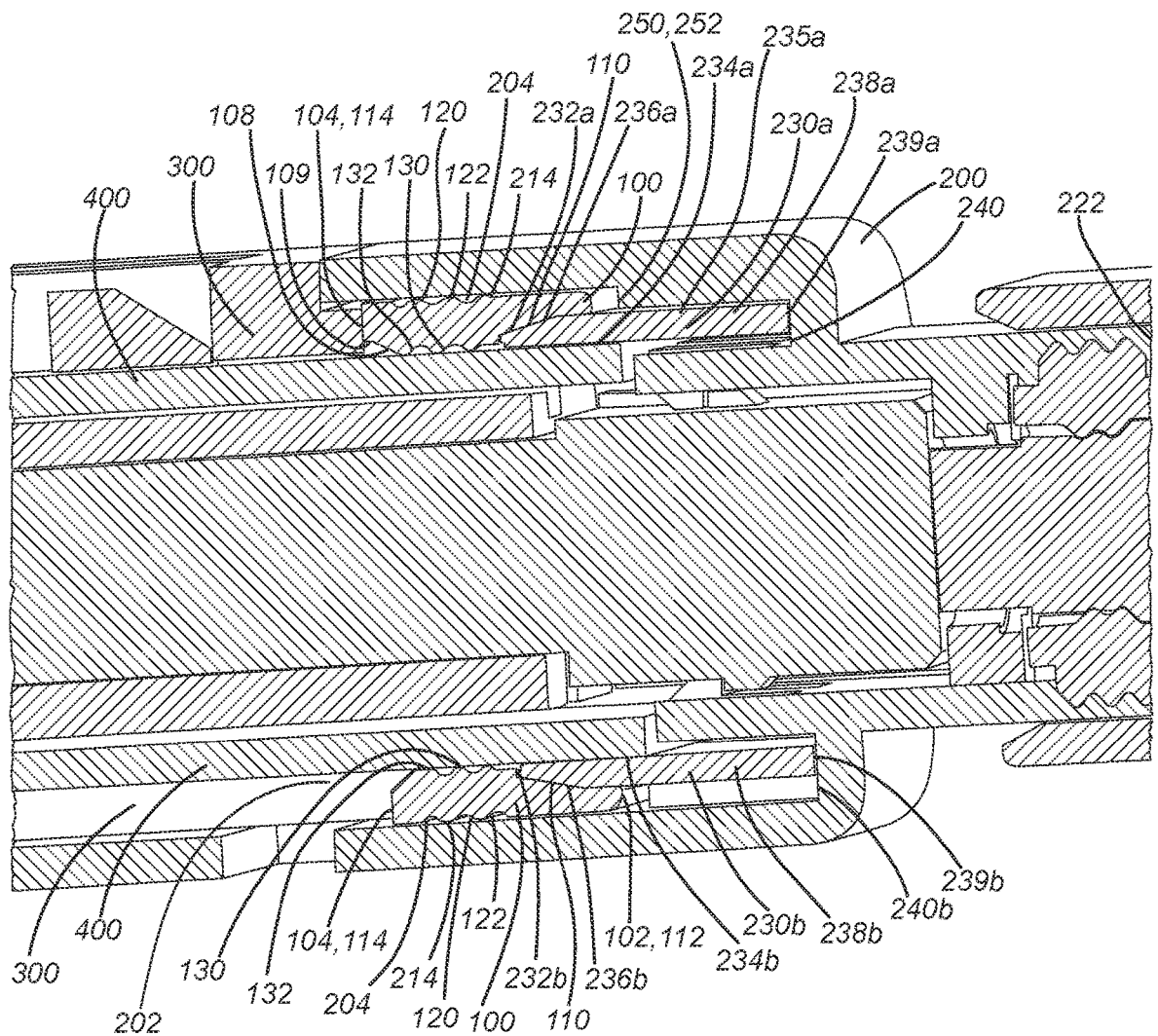
FIG. 6 is a cross section view of the a connector assembly having the outer housing, the outer housing having the seal spring inserted and residing in the cavity of the outer housing, the second outer housing installed, the third outer housing installed.

As seen in FIG. 6, the fully compressed and deformed, orientation or state of the seal spring 100, provides a spring-like force and spring function in a direction toward and against the tabs 230a, 230b of the outer housing 200. Here, as in FIG. 5, the seal spring 100 has been inserted into the inner cavity 204 of the outer housing 200, with the first face 102 of the seal spring inserted first into the inner cavity 204 and pushed forward towards the second end portion 222 of the outer housing 200. The second face 104 is situated within the inner cavity 204, facing towards the opening 202 of the outer housing 200. Here, the second outer housing 300 has been inserted through the opening 202 and into the inner cavity 204 of the outer housing. The second outer housing 300 enters the inner cavity 204 of the outer housing 200 and presses, contacts, and abuts the seal spring 100, making contact with the second face 104 and second face surface 114 of the seal spring 100. The second outer housing 300 pushes the seal spring 100 further forward into the inner cavity 204, and towards the second end portion 222 and the tabs 230a, 230b. At this point, the first face 104 and first face surface 114 of the seal spring 100 will abut and contact the forward stop 250, and the forward stop 250 will limit the movement of the seal spring 100 further into the inner cavity 204 of the outer housing. The seal spring 100 is now in a secured and stationary position within the connector system and in the outer housing 200 and inner cavity 204. In this secured, and stationary position within the inner cavity 204, in respect to the lengthwise direction of the outer housing 200 (being defined as the direction from the first end portion 212 to the second end portion 222, and vice versa), the seal spring 100 resides in the inner cavity 204 between the end of the second outer housing 300 and the forward stop 250 of the outer housing 200.

Also, in FIG. 6, a third outer housing 400 is inserted into the inner aperture 108 of the seal spring 100. The shown compressed seal spring 100, while providing adequate spring force against the tabs 230a, 230b, will also maintain and provide an outer sealing against the outer housing 200 and inner sealing function against the third outer housing 400. The outer sealing portion 120 of the seal spring 100 will seal against the side wall 214 of the inner cavity 204 of the outer housing 200 (see, FIG. 6). The inner sealing portion 130 of the seal spring 100 will seal against the surface of the third outer housing 400 (see, FIG. 6). Thus, the seal spring 100 is sealing against two independent, separate surfaces. The seal spring 100 will thus act as an interface seal in this location within the connector system and also provide itself as an environmental seal when used in this manner. Thus, the seal spring 100 will have a dual purpose, simultaneously acting as both an environmental seal and a spring when in use within the connector assembly.

Also, the seal spring in FIG. 6 is fully compressed and deformed as it is provided with the third outer housing 400 inserted into its inner aperture 108. With the insertion of the third outer housing 400, there is pressure on the inner sealing portion 130 of the seal spring 100, and returned pressure against the third outer housing 400 by the inner sealing portion 130. The seal spring 100 in this final compressed and deformed state is exerting a greater spring force against the tabs 230a, 230b than its previous interactions within its position or positions in the cavity of the outer housing. The seal spring 100 will provide a compression and spring force against the tab 230a, 230b and press the tab 230a, 230b against the third outer housing 400 when assembled, providing substantial contact of the tab 230a, 230b with the third outer housing 400. More specifically, the cantilever beam portion of the tab 230a, 230b, may make substantial contact with the third outer housing 400. More precisely, the direction the tab 230a, 230b flexes is generally inwards, a direction towards the inner cavity 204, inner aperture 108 or opposing one of another tab 230a, 230b. The spring seal 100 will provide more force, additional force, for higher contact pressure of the tabs 230a, 230b against the third outer housing 400, than would be present without the seal spring 100. This force and subsequent pressure is much more resistant to stress relaxation compared to the use of the tab 230a, 230b, cantilever beam arm 238a, 238b, and outer housing 200 made from resin alone. The benefit of the seal spring 100, is higher contact pressure between the outer housing 200 and the third outer housing 400. Concurrently, the tabs 230a, 230b have inserted further into the inner aperture 108 of the seal spring 100, and have further moved into and compressed into the flared, or angled portion of the inner surface 109 of the seal spring 100, when in comparison to its previous position or positions inside the inner cavity 204 of the outer housing 200. The third outer housing 400 is preferably a plated resin housing, conductive, and aids in shielding of the connector assembly. The outer housing 200 is also preferably conductive, comprised of a metal infused resin and also aids in shielding of the connector assembly when in use. A portion of a grounding scheme for a connector assembly which uses the outer housing 200 can be completed when the tab 230a, 230b which is also preferably conductive coated, makes contact with the conductive third outer housing 400.

The elastic properties and durability of the seal spring 100 material is optimized such that the aforementioned combination of properties and effects is provided. Additionally, the seal spring 100 of the present invention is not limited or defined into a spring section or a seal section by its geometry. Thus, the seal spring 100 is not geometry based and it may function anywhere the dual functionality of a seal function and spring function is required. Further, the size or space of the inner cavity 204 of the outer housing 200, may be optimized and adjusted to allow for deformation of the seal spring 100 in order to migrate and not interrupt the spring function or the inner and outer sealing properties of the seal spring 100. Alternatively, the size of the seal spring 100 may be optimized and adjusted to allow for the deformation of the seal spring 100 in order to migrate and not interrupt the spring function or the inner and outer sealing properties of the seal spring 100 in a housing, such as shown outer housing 200.

Although the foregoing description is directed to the preferred embodiments of the invention, it is noted that other variations and modifications will be apparent to those skilled in the art, and may be made without departing from the spirit or scope of the invention. Moreover, elements, structural arrangements, or features described in connection with one embodiment of the invention may be used in conjunction with other embodiments, even if not explicitly stated above.

I claim:

1. A connector assembly, comprising:
 a housing, said housing including a substantially flexible tab extending from an inner wall thereof; and
 a seal spring that interacts and seals with said housing, wherein said seal includes:
   a side, said side having a surface,
   a first face, said first face having a surface,
   a second face, said second face having a surface,
   an inner aperture, said inner aperture having a side wall,
   an outer sealing portion, said outer sealing portion is located on a portion of said side and is formed by a portion of said surface of said side, and
   an inner sealing portion, said inner sealing portion is located inside said inner aperture on a portion of said side wall,
 wherein said inner aperture is a through-hole between said first and second faces, wherein said side wall has an angled portion substantially toward said first face, wherein said angled portion is tapered, wherein said angled portion is configured to receive and be pressed by said substantially flexible tab of said housing and to assert a spring-like force against a portion of said substantially flexible tab, and wherein said inner sealing portion is located substantially toward said second face, said substantially flexible tab being flexed when said angled portion of said side wall of said seal spring contacts a tip, said portion or a second surface of said tab.

2. The connector assembly according to claim 1, wherein said outer sealing portion is formed by a portion of said surface of said side of said seal spring.

3. The connector assembly according to claim 1, wherein said inner sealing portion is formed by a portion of a side surface of said side wall.

4. The connector assembly according to claim 1, wherein said outer sealing portion is configured to interact and seal against a wall of a housing.

5. The connector assembly according to claim 1, wherein said inner sealing portion is configured to interact and seal against a housing.

6. The connector assembly according to claim 1, wherein said outer sealing portion is located disproportionate to the first face and second face on the side.

7. The connector assembly according to claim 1, wherein said angled portion is configured to be pressed between a tip of a cantilever beam arm of a housing and a body of the housing.

8. The connector assembly according to claim 7, wherein said angled portion is configured to assert a spring-like force against the tip.

9. The connector assembly according to claim 1, wherein said angled portion is configured to be pressed between an angled lead in of a cantilever beam arm of a housing and a body of the housing.

10. The connector assembly according to claim 1, wherein said side, said first and second faces, said inner aperture, said outer sealing portion, said side wall, and said inner sealing portion form said seal spring that is, substantially, in its entirety, a contiguous and continuous single construction.

* * * * *